United States Patent [19]

Hustig et al.

[11] Patent Number: 4,677,686

[45] Date of Patent: Jun. 30, 1987

[54] PASSIVE TRANSMISSION OF DATA OVER CABLE TV SYSTEMS

[75] Inventors: Charles H. Hustig; Jeffrey L. Ward, both of Hudson, Wis.

[73] Assignee: Applied Spectrum Technologies, Inc., Minneapolis, Minn.

[21] Appl. No.: 503,321

[22] Filed: Jun. 10, 1983

[51] Int. Cl.[4] .............................................. H04H 1/04
[52] U.S. Cl. ......................................... 455/5; 358/86; 370/73; 370/124
[58] Field of Search ........................................ 455/2-6; 358/84, 86; 370/72, 73, 124, 50; 340/533, 534, 870.12, 870.12, 505

[56] References Cited

U.S. PATENT DOCUMENTS

| | | | |
|---|---|---|---|
| 3,048,780 | 8/1962 | Diambra et al. | 455/2 |
| 3,790,700 | 2/1974 | Callais et al. | 455/5 |
| 3,806,813 | 4/1974 | Eller | 455/6 |
| 3,943,447 | 3/1976 | Shomo, III | 455/4 |
| 4,077,006 | 2/1978 | Nicholson | 455/5 |
| 4,114,150 | 9/1978 | Yamazaki et al. | 455/5 |
| 4,148,021 | 4/1979 | Watanabe | 455/5 |
| 4,198,624 | 4/1980 | Watanabe | 455/3 |
| 4,312,062 | 1/1982 | Bellanger | 370/50 |
| 4,343,042 | 8/1982 | Schrock et al. | 455/5 |

Primary Examiner—Jin F. Ng
Attorney, Agent, or Firm—Dorsey & Whitney

[57] ABSTRACT

A communications system which enables enhanced services to be provided over cable TV systems. The design of the system is such that amplification is not required. Therefore, two-way transmission is possible on the low band of "two-way capable" cable systems and intermediate power failures do not affect transmission.

Transmission of data takes place in the low band frequency range of five to thirty megahertz. The system design is such that it can withstand over a hundred dB loss between the remote terminal and the head-end. Carrier frequencies, when received, are interleaved for purposes of decoding and microprocessor based controls are used for automatic gain control and error correction.

In a preferred embodiment of the invention, two thousand five hundred carriers, each transmitting eight digital data channels of information can be simultaneously transmitted from remote terminals without any effect whatsoever on the TV signals being transmitted at the high band frequencies. The resulting system is a very economical and dependable method to achieve passive transmission of data over cable TV systems.

22 Claims, 8 Drawing Figures $$f_L = f_3 + \frac{f_{n+1} - f_n}{4}$$

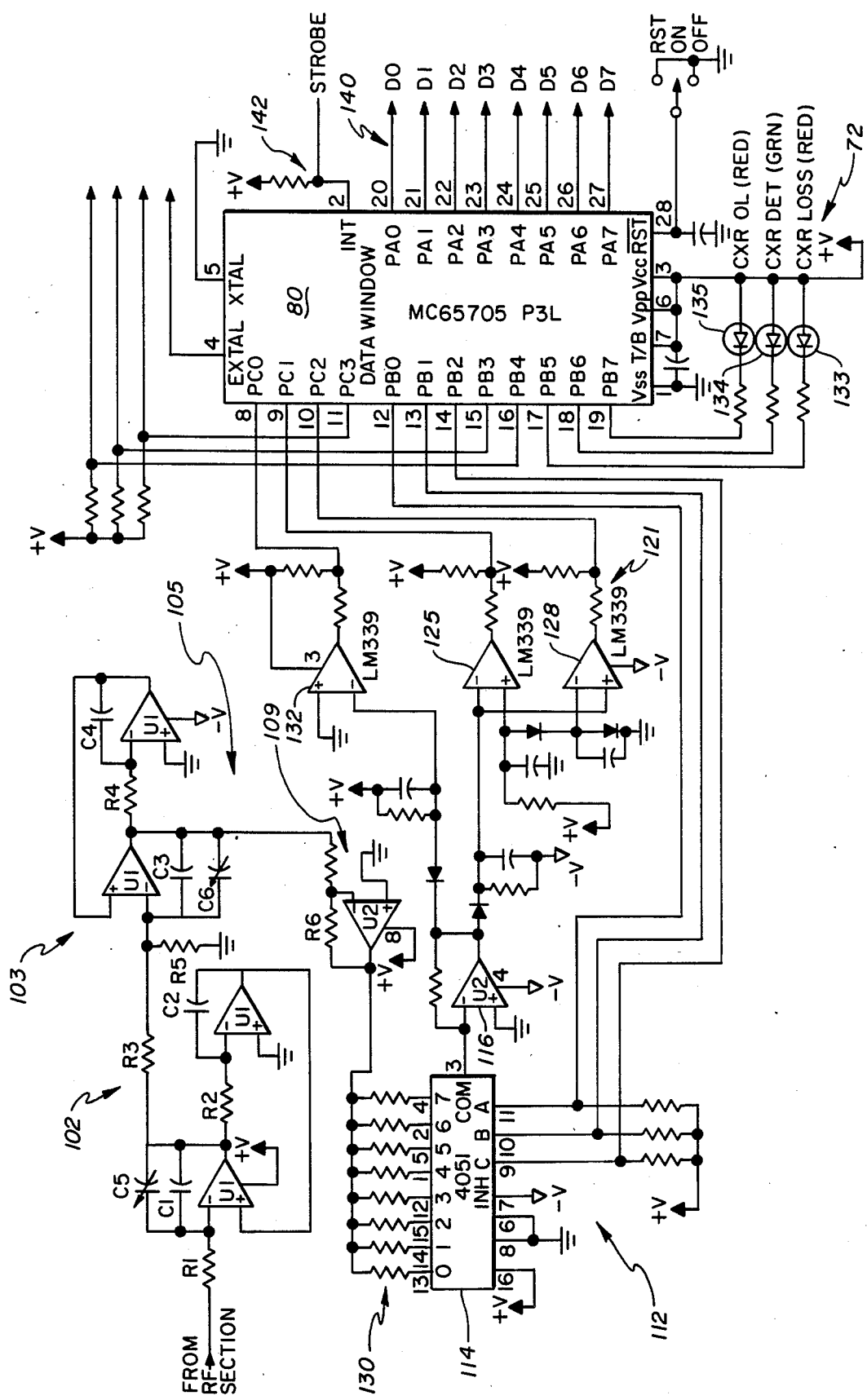

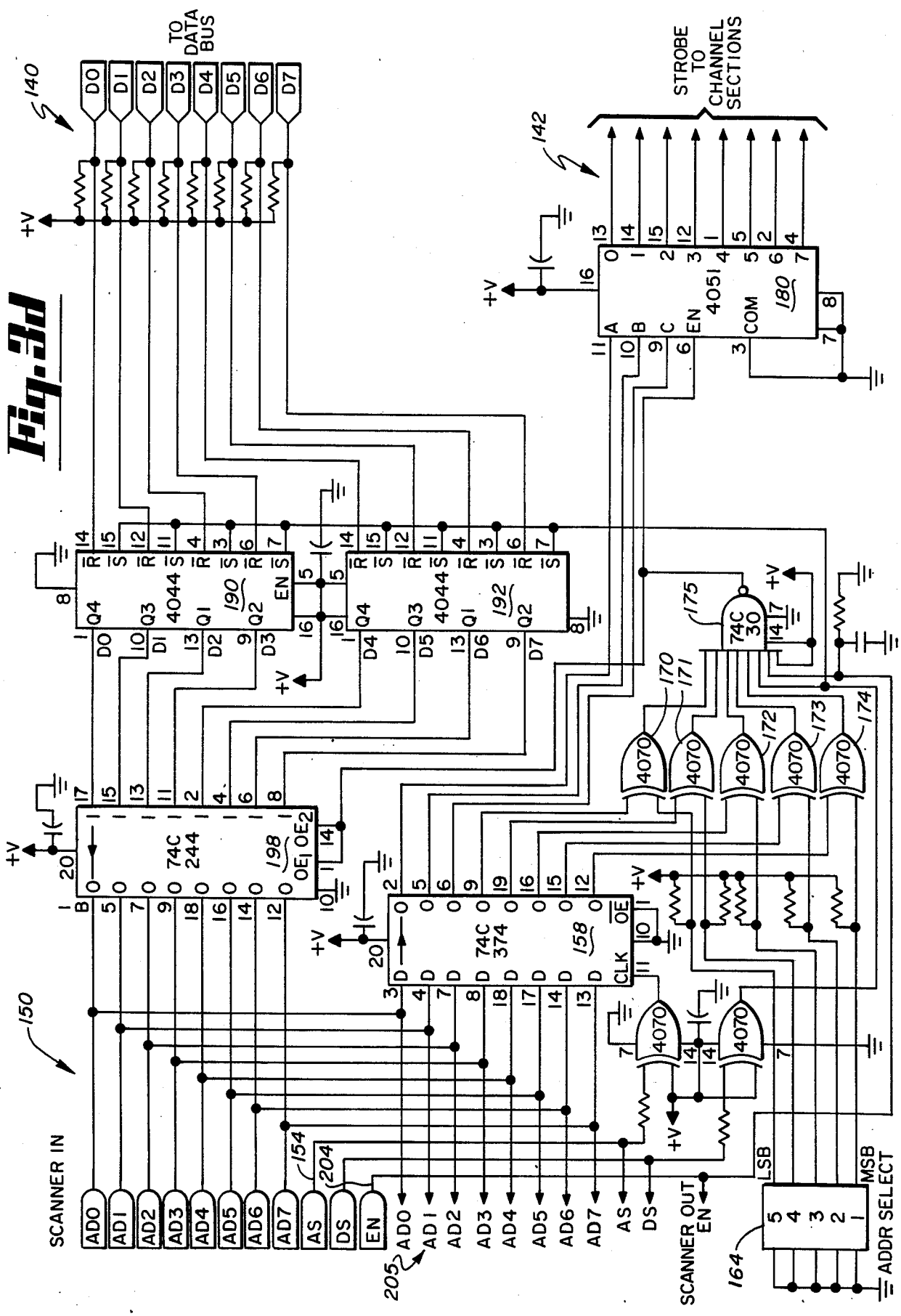

PASSIVE TRANSMISSION OF DATA OVER CABLE TV SYSTEMS

BACKGROUND OF THE INVENTION

The present invention is related to data transmission and particularly transmission of data over cable TV systems.

The initially installed cable systems for the transmission of television signals were primarily one-way transmission systems wherein the transmission of the TV signal was made through repeaters, periodically installed in the cable system, which amplified the signal. Transmission was one-way from the "head-end" to the subscribers. Two-way systems have now been specified (required) and all systems installed after 1977 are "two-way capable", although not "two-way ready".

Two-way systems employ diplexers in the repeaters. The diplexer breaks up the service spectrum into two components, a low component of five magahertz to thirty megahertz for return signaling, and a high component of fifty-four megahertz to four hundred megahertz, for transmission to the subscriber. With current two-way ready systems both the high band and the low band are amplified. Two-way transmission of data takes place by "polling" with an outgoing signal, multiplexed in with the TV signals, transmitted to the subscriber on the high band and the return signal transmitted on the power amplified low band. With current two-way "polling" systems, responses or return signals from the various subscribers are transmitted on a single time shared return channel.

A clear disadvantage of a polling system is that if one of the remote units in the transmitters locks up and it stays on, the entire system is jammed. No one else can transmit. A more serious disadvantage arises from the use of amplification. If power is lost at any repeater in the system, the signal is lost and cannot be received or decoded by the "head-end" modem. This is an obvious problem with informational type data and particularly a problem when such a system is employed as an alarm system to indicate fire, unauthorized entry or the like. It should also be obvious that, with amplification, it is only possible to transmit in one direction on the low band.

SUMMARY OF THE INVENTION

The present invention permits two-way transmission to take place on the low band of a two-way capable cable system without amplification. To allow two-way transmission to take place, jumpers may be installed in place of reverse amplifiers. Signals generated at one end are received with a sensitive, low noise, "head-end" modem at the other end. Thus, the two-way data transmission is independent of power failures affecting repeaters in the cable system.

The invention has similar advantages when used only for remote transmissions such as in a security system. No interrogation is necessary. Only one-way transmission, incoming, is utilized but it is supervised and indicates loss of signal. By using multiple received channels—each subscriber has his own unique carrier frequency—rather than a single time shared transmission channel, malfunction of one remote terminal does not affect the system. Since the signal is not amplified at the repeaters, power loss to the repeaters has no effect on a one-way system.

Basically, the system is designed and operates in the following manner. Eight channels for digital data can be allocated to and received from each subscriber. This data, for a security system, might be panic alarm, fire alarm, intrusion alarm, a channel to indicate whether or not the alarms are disarmed or in service, and other utility or supervisory transmissions such as whether the remote unit is in service, battery status, loop checks, and the like. The subscriber transmission channels are preferably transmitted on R.F. carrier frequencies with a ten kilohertz frequency separation thus permitting over two thousand five hundred carrier frequencies to be transmitted as transmission channels on the low band, each containing eight digital data channels of information. The carrier frequencies are received by a plurality of head-end modems each designed to receive a set of eight transmission channels (carrier frequencies). When received, each head-end modem utilizes a fold-over baseband demultiplexing technique to produce a set of eight standardized baseband frequencies corresponding to its unique set of carrier frequencies, so that audio range filters can be employed in the design rather than RF filters.

The demultiplexing technique is similar to a double side band demultiplexer with the frequency of the local oscillator offset from the middle frequency received so that no image is rejected. This produces a baseband output with the transmission channels interleaved at five kilohertz intervals.

Each transmission channel from each subscriber is preferably connected to a microprocessor based channel section to decode the eight digital data channels. Because of the differences in gain (loss) due to line loss, distance of the line, and the like, an automatic gain control (AGC) software routine is utilized which is digitally controlled by the microprocessor. The user at the central office terminal can also select one of three error correction algorithms which are also encoded in the microprocessor for processing the data.

The output of the head-end modem is connected to a display terminal and/or printer of conventional design using an RS232 scanner interface board. Using the RS232 scanner board the digital data channels from each subscriber are sequentially scanned. The eight bit address input to the modem from the scanner is decoded as follows. The five most significant bits are compared with the particular address of the head-end modem whose data is to be scanned. This address is encoded in the modem with a dip switch. The least three significant bits represent the baseband carrier frequencies one through eight for each head-end modem. Therefore, with a single scanner and thirty-two head-end modems each of eight digital data channels can be scanned for up to two hundred fifty-six subscribers. Additional subscribers can be served simply by adding additional scanners.

With the system elements disclosed an extremely dependable communications system is achieved which is of modular design. That is, an initial limited system can be installed to service a few customers and upgraded as more subscribers subscribe to the service. Except for the circuit components which determine the carrier frequency of subscribers' transmission channels, all modules are interchangeable with variables such as address and preferred error correction algorithms selectable for each subscriber with manual switches.

The overall design of the system yields an inexpensive communication system for enhanced services on TV cable systems that can operate with over one hundred dB of loss from the remote terminal to the head-end. With the channel separation proposed as the preferred embodiment each cable system can support approximately two thousand five hundred subscribers.

These and other objects and advantages of the invention will be obvious to those skilled in the art upon a review of the Description of the Preferred Embodiment set forth below, the enclosed drawings, and the claims appended hereto.

DESCRIPTION OF THE DRAWINGS

FIG. 2 is a sketch showing the frequency separation utilized to transmit, receive and decode the data.

FIG. 3, consisting of FIGS. 3a-3d, is a schematic diagram of a head-end modem which can be used to practice the invention. FIG. 3b shows one of eight channel sections in the modem, each of which provides eight digital data channels, one for each of eight individual subscribers. FIG. 3d shows the decoder section which is used for eight subscribers wherein the scanner addresses the modem receiving data from eight subscribers and reads the digital data from each digital data channel for all eight subscribers for purposes of comparing it with previous data from each subscriber so that changes in data, if any, can be printed on the display device shown in FIG. 1.

DESCRIPTION OF THE PREFERRED EMBODIMENT

Figure 1:
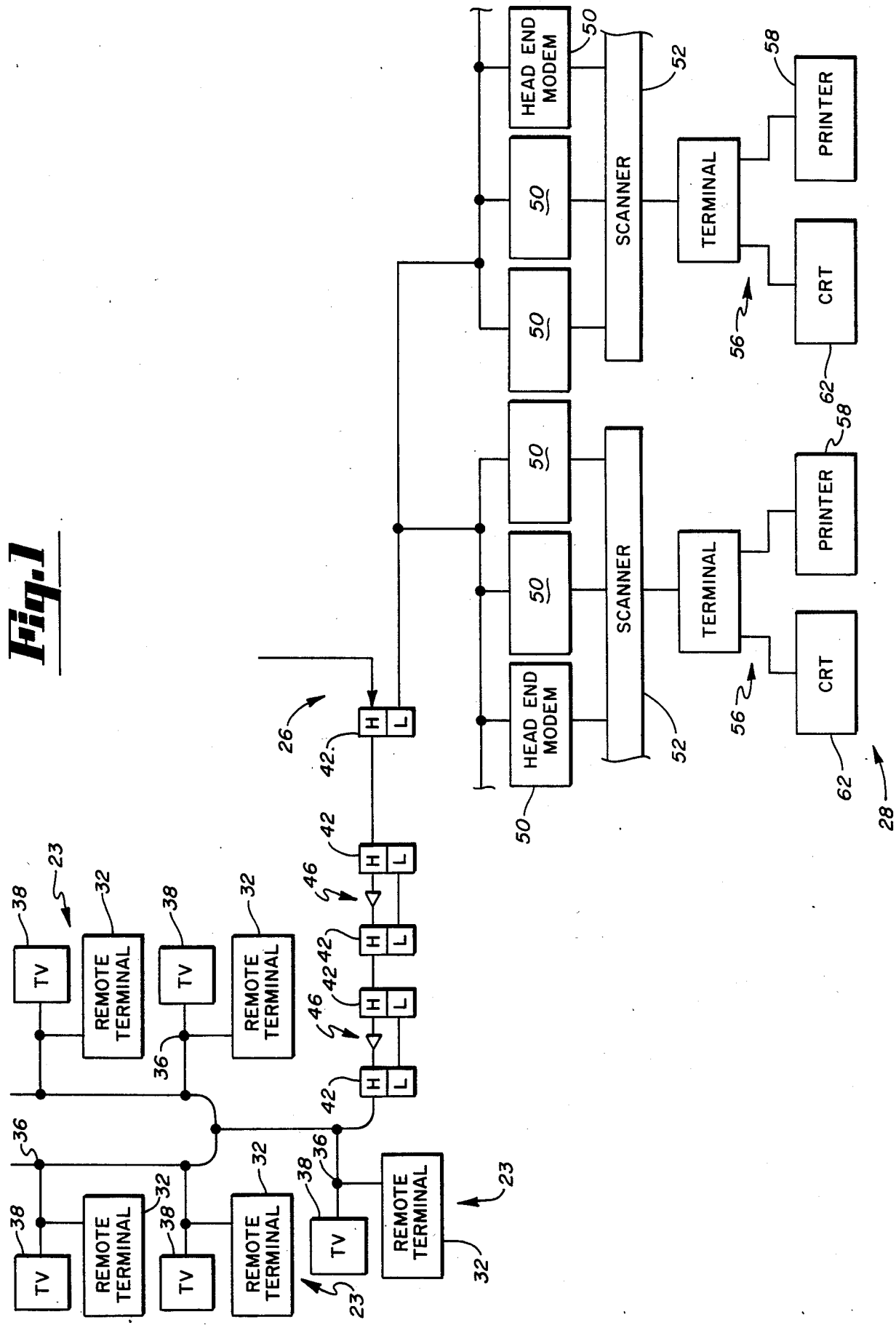
FIG. 1 is a block diagram of a representative communications system employing the invention showing a number of remote terminals transmitting data to a central office location in which a corresponding number of head-end modems are utilized, each of which is connected to a display device and/or a printer which alerts the operator at the central office location to any change in data from the subscribers.

FIG. 1 shows a representative sketch of a preferred embodiment of the invention. The invention is designed to be used with a coaxial cable TV system and, for purposes of the disclosure, is discussed in connection with a security system transmitting alarms from remote subscriber locations 23 to a central office or location 26. As disclosed in more detail below, the preferred transmission method of data is "passive", that is, unamplified, and takes place on the low band of a diplexed two-way capable cable system. It should be obvious that the invention can also be used with prior one-way systems with the addition of diplexers to the repeaters in use on those systems, or with amplified two-way systems if one is willing to accept less reliability.

The data can be tapped off the line at any intermediate location or at the "head-end" of the line. For example, for a security system in a condominium complex or a marina, a security or guard station can be employed at a cable system branch into the complex and the decoding circuitry 28, FIG. 3, of the present invention can be utilized for purposes of security of the complex.

In a preferred embodiment of the system, eight digital data channels 30 of data are allocated to each subscriber. When the system is used for security, a remote terminal 32 can be used to transmit on the data channels 30 a panic alarm, a fire alarm, a smoke alarm, an intrusion alarm, and certain supervisory and utility signals such as unit use, use of alarms, battery charge, loop check, and the like. The remote terminal 32 is tapped into the cable system with conventional taps 36 in a manner similar to, and in parallel with, the television set 38 which is receiving the various channels transmitted on the cable system.

In a two-way capable or two-way ready cable system the transmission band is split by diplexers 42 into two bands, a low band of approximately five to thirty megahertz and a high band of approximately fifty-four to four hundred megahertz. Diplexers 42 are used in the repeaters 46 of the system to maintain the two frequency bands. The preferred embodiment of the present invention disclosed transmits on the low band.

In the embodiment disclosed eight digital data channels 30 are allocated per subscriber 23. Each subscriber is assigned a separate carrier frequency $f_n$ generated by a frequency generator 47 at each subscriber location as a transmission channel with ten kilohertz between carriers. Therefore, up to two thousand five hundred subscribers 23 can be serviced on a system of this design, each subscriber 23 having eight digital data channels to be transmitted. It should also be clear that a larger number of subscribers 23 and/or channels can be served using less than ten kilohertz separation between transmission channels.

The data in a preferred embodiment of the system is amplitude keyed AM and transmitted in a UART 34 format so that the mark symbol is "carrier on" and the space symbol is "carrier off". This produces a digital AM signal which can be transmitted at one hundred twenty-eight bits per second. An output amplifier 48 is used to produce a preferred output power for the remote modem or terminal 32 on the order of ten milliwatts output.

For an alarm or security system the signals are preferably transmitted on the low band in a direction opposite to the transmission of the television signals. No amplification is used for the data transmission. Therefore, in a two-way ready system the low band amplifier position in the various repeaters is jumpered. This greatly enhances the dependability of the system since a power loss or failure of an amplifier in any of the repeaters does not affect the system in any way. In addition, since the data is being transmitted unamplified, it should also be clear that data transmission can take place in either direction or, if desired, in both directions with different carrier frequencies assigned to the various data transmissions.

Data is decoded at the "head-end" of the system with head-end modems 50, shown in FIG. 3, one for each eight subscribers 23. Each head-end modem 50 receives eight transmission channels or carrier frequencies, each containing the eight digital data bits of information from a different subscriber 23. All of the modems 50 then, with baseband multiplexing, convert their unique set of carrier frequencies into a standardized set of baseband carrier frequencies shown in FIG. 2b. Each baseband frequency in each modem 50 is then decoded with a microprocessor 80 to obtain the information from the eight digital data bits transmitted by the subscriber 23.

Figure 3A:
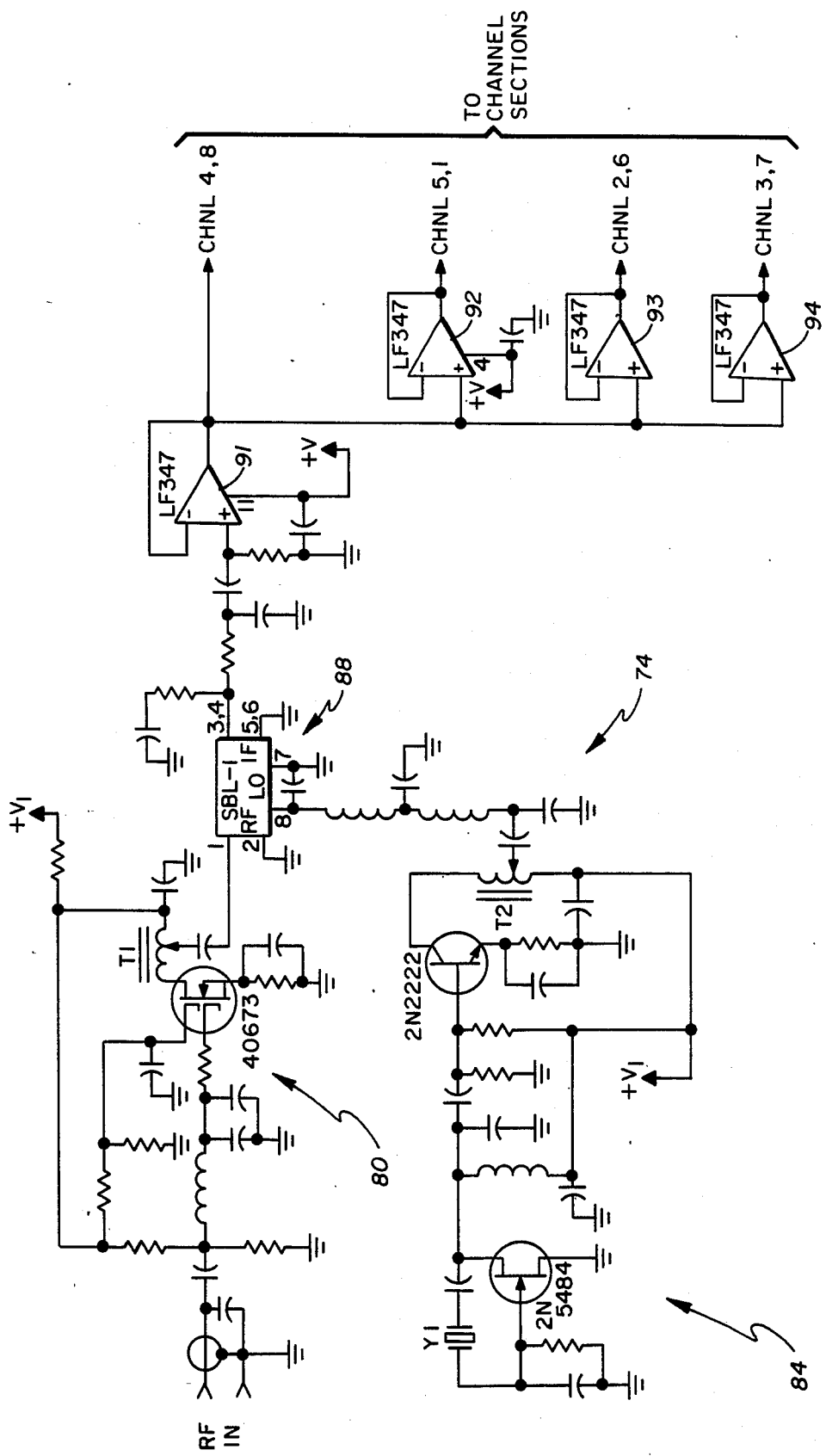
FIG. 3a is the schematic of the RF section of the modem which receives the radio frequency carrier signals and interleaves the baseband signals for each transmission channel from each subscriber.

A sensitive low noise receiver shown in FIG. 3a is used in the head-end modems 50 to receive and decode the carrier frequencies being transmitted. In a preferred embodiment of the system, the digital data from the modems 50 is scanned with RS232 scanners 52 and the data from each subscriber is compared with the previous transmission from that subscriber and, if there is a change in data, an output is printed on a video display terminal 56 and/or a hard copy printed 58. If there is a change in signal transmission an audible alarm is sounded and a detailed printout preferably occurs on the display screen 62 or printer 58 identifying the subscriber 23, his location and type of alarm or problem, so that the operator is immediately alerted to an alarm situation at any of the subscribers' residences or places of business, or to the occurrence of a malfunction in the transmitting modem. The operator can then take the appropriate action. In addition, LED displays 72 are also preferably used for each subscriber channel to indicate an immediate problem with the system.

Figure 3C:
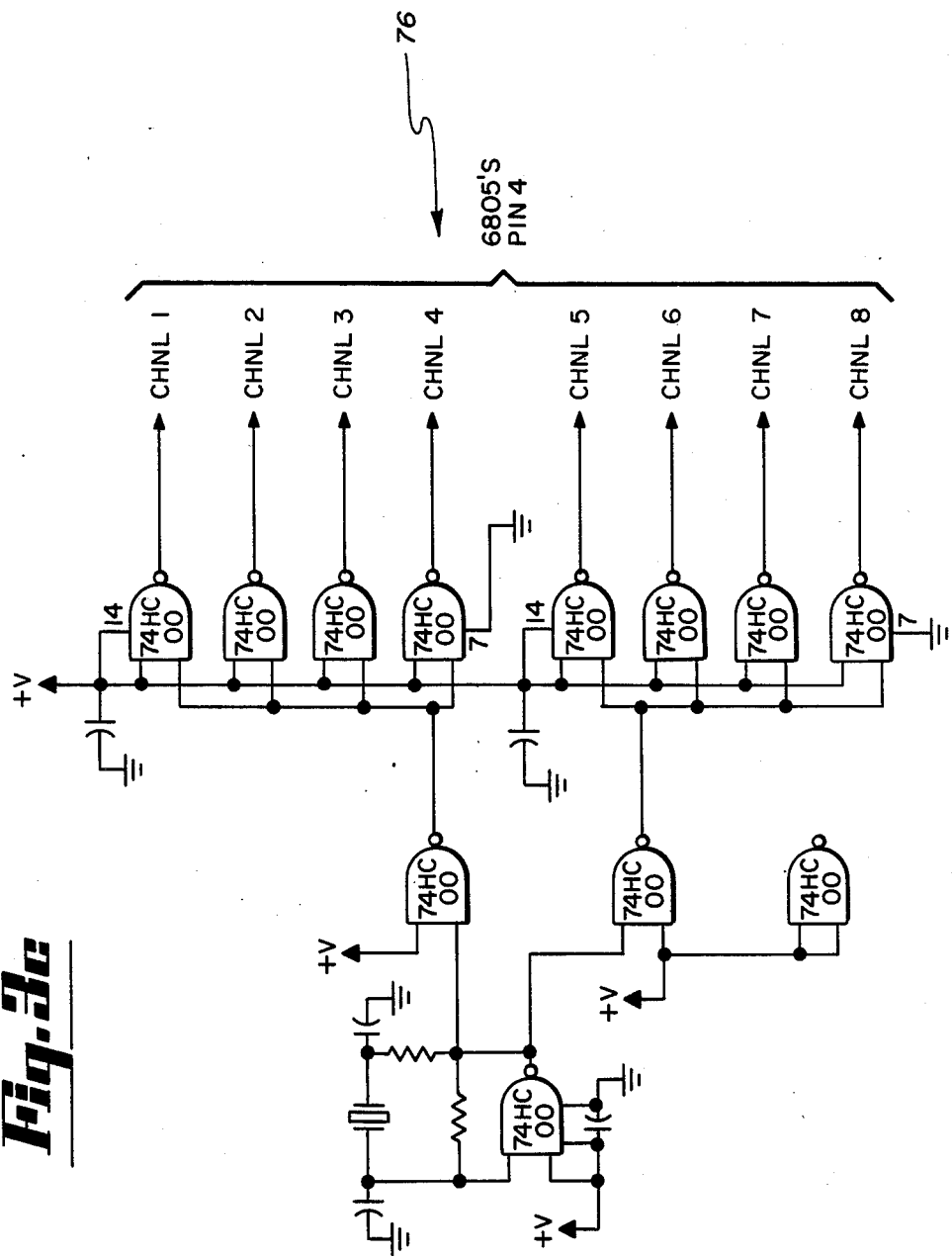
FIG. 3c shows the microprocessor clock distribution circuit which clocks data into the eight channel microprocessors.
Figure 4:
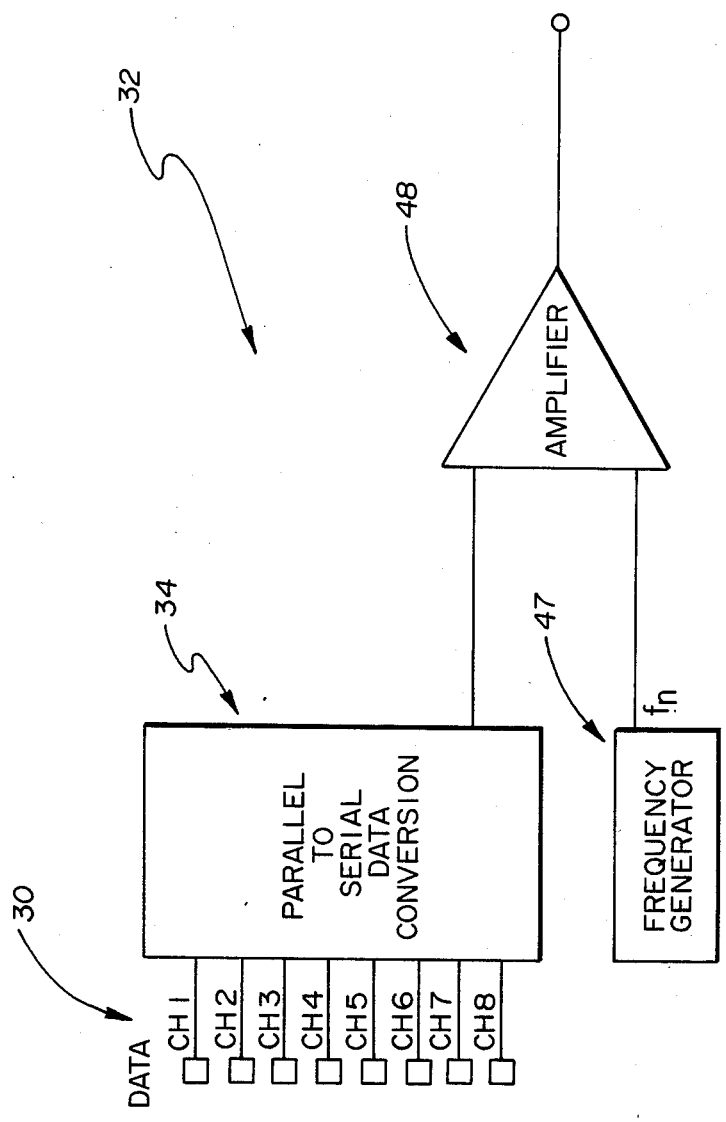
FIG. 4 is a block diagram of a remote terminal which can be used to generate, encode and transmit the data from each subscriber.

Referring to FIG. 3, the head-end modem 50 is disclosed in schematic form. A low noise design is maintained throughout the unit, 50. Three basic circuits are disclosed; the RF receiving section 74 of the modem 50 shown in FIG. 3a, one of the eight channel sections shown in FIG. 3b, and the decoder section shown in FIG. 3d. It will be understood by those skilled in the art that the head-end modem 50 will also include conventional circuits such as an AC power supply which is constructed and utilized in a conventional manner and a microprocessor clock distribution circuit 76 such as that shown in FIG. 3c. Each head-end modem 50 serves eight subscribers 23 and, therefore, will have eight of the channel sections shown in FIG. 3b.

The RF receiver shown in FIG. 3a utilizes a MOSFET low noise preamplifier 80 and is configured like a double sideband receiver but with the frequency of the local oscillator 84 offset from the center frequency. Both the amplifier 80 and the local oscillator 84 are connected to a diode ring mixer 88. If the received carriers are spaced ten kilohertz apart the local oscillator 84 is preferably set to two and a half kilohertz above the fourth carrier transmission channel, $f_3$, of the eight carriers to be received and decoded by the particular modem. This frequency $f_L$ can be expressed by the following algorithm:

$$f_L = f_3 + \frac{f_{n+1} - f_n}{4}$$

Figure 2A:
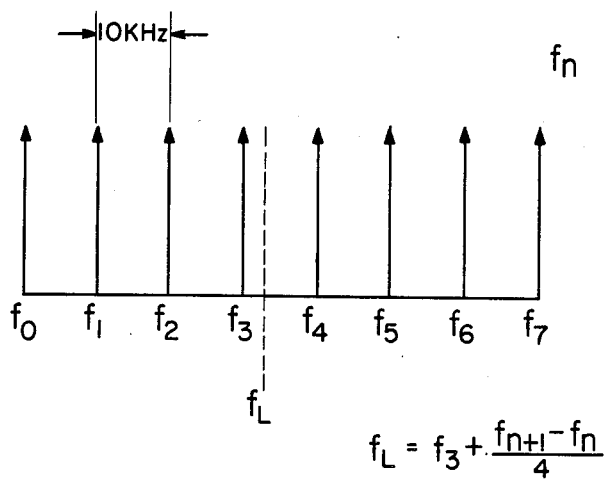
FIG. 2a shows a representative set of eight transmission channels or carriers, $f_0$-$f_7$, transmitted from a set of eight subscribers, each transmission channel being transmitted with a ten kilohertz frequency separation from the next preceding and succeeding carrier frequency. Also shown in FIG. 2a is the local oscillator frequency $f_L$ used for interleaving the baseband carriers at the receiver.

This frequency mix is diagrammed in FIG. 2a. This design produces eight baseband frequencies for decoding the data transmitted over each of the transmission channels, separated by approximately five kilohertz.

Figure 2B:
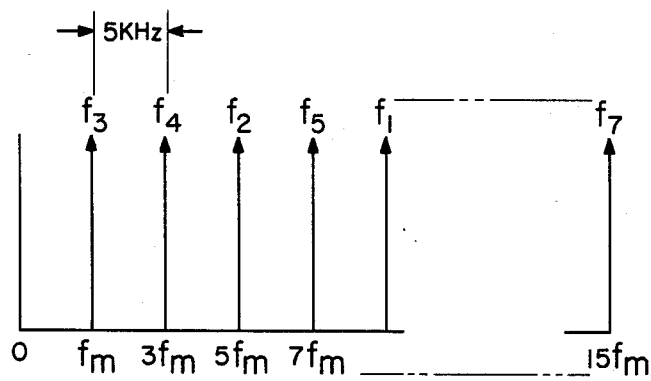
FIG. 2b is a set of the resulting intermediate or audible baseband carrier frequencies which are used to decode the information being transmitted, each frequency being separated by five kilohertz from the next preceding and succeeding baseband carrier frequency.

Shown in FIG. 2b is the resulting output for eight subscribers 23 where $f_m$ is the offset from the oscillator 84 frequency, $f_L$, and where the baseband channel separation, $\Delta f_b$ is:

$$\Delta f_b = 2f_m \text{ or } \frac{f_{n+1} - f_n}{2}, \text{ where } f_m = \frac{f_{n+1} - f_n}{4}$$

This provides a range of baseband frequencies for decoding the data from each subscriber 23 which varies between two and a half kilohertz to thirty-seven and a half kilohertz for the eight channels with each channel being separated by five kilohertz.

Four voltage followers 91-94, manufacturer's designation LF347, are used to distribute the incoming signals to the channel sections. Two channels per voltage follower 91-94 are used for load matching with the data being cycled into the channel microprocessors 80 with the clock distribution circuitry 76 of FIG. 3c. The output of the RF section shown in FIG. 3a is connected to the eight channel sections, one of which is shown in FIG. 3b.

As shown in FIG. 3b, each channel section uses a two section 102, 103 active bandpass filter 105 that picks off one of the eight baseband frequencies from two and a half to thirty-seven and a half kilohertz. Adjustable capacitors C5 and C6 can be adjusted to fine tune the center frequency of the filters 102, 103.

The output from the active bandpass filters 105 is amplified with an op amp 109 to equalize the gain through or load of the filters 105, the output of which 109 is connected to a programmable gain amplifier 112 consisting of an eight channel analog multiplexer-demultiplexer 114, manufacturer's designation 4051, and a second operational amplifier 116. The programmable gain amplifier 112 is driven by the channel microprocessor 80 and provides a digitally controlled automatic gain for the system which adapts the system to gains which may vary over plus or minus twelve dB of the input range. In this manner the output of the AM envelope detector 121 is kept within a three dB range or within one and half dB of its optimum value.

As shown in FIG. 3b two operational amplifiers 125, 128, manufacturer's designation LM339, comprise a window detector 121 which determines if the detected signal is within the desired range. If the signal is too high then one 125 of the op amps 125, 128, will pull an input to the microprocessor 80 low. If the signal is too low then the other op amp 128 pulls a different input to the microprocessor 80 to low.

The processor 80, with conventional automatic gain control (AGC) programming, determines whether or not the gain must be increased or decreased. Depending on which input to the microprocessor 80 is low the software causes a control signal to be issued to the three control outputs A, B, C on the multiplexer-demultiplexer 114 to step up or down by one count depending on which way the gain must be changed. This steps the input to the multiplexer-demultiplexer 114 through the resistor bank 130 connected to the input of the programmable gain controller 112 thereby assuring a tightly controlled input.

Preferably the sample rate is approximately once a second. This enables the system to track slow changes in signal level which occur on a cable system as the cable heats up or cools down thereby causing loss changes according to the temperature of the cable.

The eight digital data channels are serially read by the microprocessor 80 from the output of the programmable gain controller 112, through a comparator 132 into input port PCO of the microprocessor 80 for parallel output on parallel port A of the microprocessor 80, pins 20-27. Conventional error correction algorithms are also preferably part of the microprocessor 80 software. Dip switches (not shown) can conveniently be located on the housing to choose one of three routines depending on the preference of the operator or the conditions associated with the particular installation of the system. Continuing the low noise design, these routines also preferably compensate for any noise transmitted during a carrier off "space".

An immediately visible and constant display of system status is provided with the use of three LED 133-135 outputs PB5, PB6 and PB7 for each subscriber channel shown in FIG. 3b. Preferably a red LED 133 indicates loss of signal or carrier. A green LED 134 indicates carrier detect mode, i.e. presence of signal. And a yellow LED 135 indicates that the signal is too strong, carrier overload, requiring a fixed pad in front of the receiver 74. An eight bit processor 80 is preferably used for the preferred embodiment disclosed, having one K of read only memory and about sixty-four bytes of random access memory. Such processors are commercially available, for example, manufacturer's designation Motorola 6805.

Each of the eight microprocessors 80 is connected to a parallel data bus 140 which is time shared. Each processor interrupt 142 is essentially a strobe for each individual transmission channel. The strobe is generated by the decoder section shown in FIG. 3d.

Referring to FIG. 3d, the decoder section is driven from a RS232 scanner board 52 which communicates with the display terminal or device 56, 58, 62.

A counter in the scanner 52 sequentially puts an eight bit address on the scanner input bus 150. The scanner then drives the address strobe 154 low. That latches the address in an eight bit register 158, manufacturer's designation 74C374, where the five most significant bits can be compared to the modem address which is programmed into a five bit dip switch 164, using exclusive OR gates 170-174 and a NAND gate 175 as a comparator. If the address matches, an eight channel multiplexer-demultiplexer 180 is enabled and used to sequentially strobe the digital data signals associated with each baseband transmission channel. The channels are sequentially strobed by the three least significant bits of the changing eight bit scanner 52 address from the input bus 150.

Each channel is strobed to provide a ten microsecond pulse of output data in a parallel format into two set-reset latches, 190, 192, manufacturer's designation 4044. The latches 190, 192 are enabled to output data on the data bus through the tristate gate 198, manufacturer's designation 74C244. Data output occurs in response to a data strobe 204 from the scanner 50.

The scanner then reads the eight digital bits of data on the bus 205 for each subscriber. The data is compared to the previous reading for that subscriber channel retained in memory. If the data has not changed for any subscriber the scanner 52 simply steps to the next modem 50 address. If the data has changed since the last read time the terminal 56 will print a message on the CRT 62 or a hard copy printer 58, or both.

Using the design disclosed up to two hundred fifty-six subscribers 23, with head-end modem 50 address designations 0 through 31, can be serviced by one RS232 eight bit scanner board, 52. Up to thirty-two head-end modems 50 for sets of eight subscribers 23 can be connected in parallel by ribbon cable so that the scanner 52 can sequentially interrogate each of the modems to obtain the alarm status and operational status of each remote user, 23.

The resulting system is extremely inexpensive, reliable and dependable, and of modular design so that the communication system can grow as more subscribers desire the enhanced services. A fully developed one-way system of the type disclosed as a preferred embodiment would serve two thousand five hundred subscribers, requiring two thousand five hundred remote terminals 32, three hundred thirteen head-end modems 50 of the design shown in FIG. 3, each modem 50 serving eight subscribers 23, and ten scanner modules 52, each of which may employ its own display device 56 or all of which can be connected to a single display, 56. The modular design is such that smaller systems can be employed, for example the security system limited to a single apartment or condominium complex.

It will be obvious to those skilled in the art that many variations can be made in the preferred embodiment which will not depart from the scope or intendment of the invention as set forth in the appended claims. For example, it would be possible to double the number of transmission channels available on the system by spacing them five kilohertz apart and a single sideband type receiver could also be utilized. Similarly, since transmission is unamplified and each data transmission is assigned a different carrier frequency, it is equally possible to achieve two-way transmission on the low band by repositioning of the remote terminals 32 and head-end modems 50 without varying the invention in any substantial manner. These and other such variations are intended to be within the scope of the appended claims.

Having described a preferred embodiment of our invention, we claim:

1. A passive data transmission system for a two-way coaxial cable system having repeaters, the repeaters having diplexers to split the transmission spectrum into a high frequency band and a low frequency band, the data transmission to take place in either direction on the low frequency band without amplification, comprising:
a plurality of subscriber terminals comprising means for concurrently and continuously transmitting digitally encoded data from all the subscriber terminals at different radio frequencies on the low frequency band and wherein each subscriber terminal is allocated a plurality of digital data channels, each subscriber terminal comprising:
means for generating different data signals for each allocated digital data channel to be transmitted;
means for encoding the data for transmission;
means for generating a different low band carrier frequency for each subscriber terminal;
means for connecting each subscriber terminal to the coaxial cable system so that the encoded data from each subscriber is transmitted at the different low band carrier frequencies, each subscriber terminal continuously transmitting on a different one of the carrier frequencies;
means for receiving the encoded data transmitted on the cable system comprising;
means for connecting the receiving means to the coaxial cable system so that the encoded data from each subscriber is continuously and concurrently received at the plurality of low band carrier frequencies;

a plurality of modems, each receiving data from a plurality of subscribers;

scanning means for scanning the plurality of modems;

means for decoding the transmitted encoded data from each subscriber terminal; and means for directly connecting the transmitting means and the receiving means through the diplexers so that the encoded data is transmitted and received at the plurality of low band carrier frequencies without intervening amplification by the coaxial cable system repeaters.

2. The passive data transmission system of claim 1 wherein the means for generating data comprises means for generating alarm signals.

3. The passive data transmission system of claim 1 wherein the data generating means comprises means for generating supervisory and operating status data signals indicating the operational status of the generating means and the transmitting means.

4. The passive data transmission system of claim 1 wherein the means for generating data comprises means for generating a plurality of data signals to be transmitted on the cable system, wherein the means for receiving data comprises means for receiving each of the plurality of encoded data signals transmitted on the cable system and wherein the means for decoding the transmitted data comprises means for decoding each of the plurality of encoded data signals transmitted on the cable system.

5. The passive data transmission system of claim 1 wherein the means for generating data comprises means for generating eight different digital data signals at each subscriber location.

6. The passive data transmission system of claim 1 wherein the means for transmitting the encoded data signals comprises means for transmitting the carrier frequencies with at least ten kilohertz between each carrier frequency transmission.

7. The passive data transmission system of claim 1 wherein the diplexers comprise high band terminals and low band terminals, and wherein the means for directly connecting the transmitting means and the receiving means comprises a jumper cable at each repeater directly connecting the low band terminals of the diplexers.

8. The passive data transmission system of claim 1 wherein each modem comprises:

a radio frequency receiver;

a local oscillator;

a mixer connected to the radio frequency receiver and the local oscillator; and wherein the local oscillator frequency is offset from the center frequency of transmission so that all transmitted frequencies are received and the output frequencies produced by the mixer are determined by the difference between the frequency of the transmitted signal and the frequency of the local oscillator.

9. The passive data transmission system of claim 1 wherein the receiving means comprises a plurality of receivers, one for each subscriber and wherein the carrier frequencies from each subscriber are decoded by the decoding means into a plurality of baseband frequency channels of information each having encoded data generated for each subscriber.

10. The passive data transmission system of claim 9 wherein the data generating means comprises means for generating eight different digital data signals at each of at least eight subscriber locations and wherein the decoding means comprise means for decoding the received encoded data into eight baseband frequency channels of encoded information, said channel frequencies ranging between two and a half kilohertz and thirty-seven and a half kilohertz with at least five kilohertz separation between each channel.

11. The passive data transmission system of claim 9 wherein the decoding means comprises means for decoding data from each of the baseband channel frequencies.

12. The passive data transmission system of claim 9 wherein the decoding means comprise at least one active bandpass filter for each baseband channel frequency.

13. The passive data transmission system of claim 9 wherein the decoding means comprises a microprocessor.

14. The passive data transmission system of claim 13 wherein the microprocessor comprises means for automatically controlling the gain of the baseband channel frequency connected to the microprocessor.

15. The passive data transmission system of claim 13 wherein the microprocessor comprises means for converting the encoded information from each baseband channel frequency into an eight bit data word.

16. The passive data transmission system of claim 15 wherein the microprocessor comprises means for correcting errors in the decoded eight bit data word.

17. The passive data transmission system of claim 16 wherein the decoding means comprises a scanner for sequentially scanning the data words on each baseband channel.

18. The passive data transmission system of claim 17 wherein the decoding means comprises means for comparing current data transmissions with previous data transmissions and a printing means whereby any change in data is printed on the display means.

19. The passive data transmission system of claim 9 wherein the decoding means comprises a microprocessor for each baseband channel of information received.

20. The passive data transmission system of claim 1 for use on a coaxial cable system having subscribers wherein:

the data generating means comprises means for generating a plurality of data signals for each subscriber;

the encoding means comprises means for encoding the data into digital data signals for each subscriber;

the transmitting means comprises means for transmitting the digital data signals from each subscriber on a different carrier frequency for each subscriber;

the receiving means comprises a plurality of receivers, each receiving carrier frequencies from a plurality of subscribers;

the decoding means comprises means for converting the carrier frequencies to baseband frequencies for decoding; and the decoding means comprises means for converting each baseband frequency into a multiple bit data word which corresponds to the plurality of data signals generated by the generating means.

21. The passive data transmission system of claim 20 wherein:

the data generating means comprise means for creating eight data signals for each subscriber;

the encoding means comprises means for encoding the data into an eight bit digital data signal; and the decoding means comprise means for converting each baseband frequency into an eight bit digital data word which corresponds to the eight bit digital data signal encoded by the encoding means.

22. The passive data transmission system of claim 20 wherein:

the receiving means comprises a plurality of receivers, each receiver receiving carrier frequencies from eight subscribers; and the decoding means comprises means for converting the carrier frequencies to eight baseband frequencies for decoding.

* * * * *